(12) United States Patent
Hasebe

(10) Patent No.: US 6,819,235 B2
(45) Date of Patent: Nov. 16, 2004

(54) METHOD AND APPARATUS FOR AUTOMATICALLY CANCELING TURN SIGNALS OF VEHICLES

(75) Inventor: Kiyoshi Hasebe, Inasa-gun (JP)

(73) Assignee: Yamaha Corporation, Hamamatsu (JP)

( * ) Notice: Subject to any disclaimer, the term of this patent is extended or adjusted under 35 U.S.C. 154(b) by 95 days.

(21) Appl. No.: 10/356,900

(22) Filed: Feb. 3, 2003

(65) Prior Publication Data

US 2003/0146832 A1 Aug. 7, 2003

(30) Foreign Application Priority Data

Feb. 5, 2002 (JP) .................................... P2002-028232

(51) Int. Cl.[7] ................................................ B60Q 1/40
(52) U.S. Cl. ..................................... 340/476; 340/475
(58) Field of Search ................................. 340/475, 476, 340/468, 465

(56) References Cited

U.S. PATENT DOCUMENTS 3,876,976 A * 4/1975 Cross, Jr. ..................... 340/476
6,414,593 B1 * 7/2002 Conner et al. ............... 340/475
6,483,430 B2 * 11/2002 Okuda et al. ................ 340/476

FOREIGN PATENT DOCUMENTS

JP  Sho 57-84242   5/1982
JP  Sho 57-155131  9/1982

* cited by examiner

Primary Examiner—Jeffery Hofsass
Assistant Examiner—Eric Blount
(74) Attorney, Agent, or Firm—Pillsbury Winthrop LLP (57) ABSTRACT

An automatic turn signal canceller of this invention is constituted using a geomagnetic sensor for detection of axial components of the geomagnetism (or magnetic field) and a conversion table storing relationships between bearings, inclinations, and outputs of the geomagnetic sensor, which are measured in advance. After the operator (or driver) of a motorcycle operates turn signals to indicate leftward or rightward turning of the traveling direction, the operator turns the traveling direction while inclining (or banking) the motorcycle. In this case, when the bearing of the motorcycle is varied by a prescribed angle (e.g., 20°) or more after the operator operates the turn signals, and then, the inclination of the motorcycle is restored to the normal position substantially perpendicular to the horizontal plane because the operator completely finishes turning the motorcycle, the turn signals are automatically canceled.

10 Claims, 6 Drawing Sheets

| V_X (Oe) | V_Y (Oe) | BEARING α (deg) | INCLINATION β (deg) |
|---|---|---|---|
| −0.58 | 0.13 | 256 | 1 |
| −0.58 | 0.10 | 257 | 1 |
| −0.58 | 0.08 | 259 | 3 |
| −0.58 | 0.05 | 260 | 4 |
| −0.58 | 0.03 | 262 | 5 |
| −0.58 | 0.00 | 264 | 6 |
| OMISSION | | | |
| −0.58 | −0.28 | 270 | 33 |
| −0.58 | −0.30 | 270 | 36 |
| −0.55 | 0.20 | 247 | 0 |
| −0.55 | 0.18 | 248 | 1 |
| OMISSION | | | |
| −0.55 | −0.38 | 278 | 39 |
| −0.55 | −0.40 | 279 | 42 |
| −0.53 | 0.25 | 240 | 0 |
| −0.53 | 0.23 | 242 | 1 |
| OMISSION | | | |
| 0.00 | −0.68 | 360 | 28 |
| 0.00 | −0.70 | 360 | 38 |
| 0.03 | 0.50 | 178 | 0 |
| 0.03 | 0.48 | 177 | 2 |
| OMISSION | | | |
| 0.55 | −0.38 | 82 | 39 |
| 0.55 | −0.40 | 81 | 42 |
| 0.58 | 0.13 | 105 | 1 |
| 0.58 | 0.10 | 103 | 1 |
| OMISSION | | | |
| 0.58 | −0.28 | 90 | 33 |
| 0.58 | −0.30 | 90 | 36 |

METHOD AND APPARATUS FOR AUTOMATICALLY CANCELING TURN SIGNALS OF VEHICLES

BACKGROUND OF THE INVENTION

1. Field of the Invention

This invention relates to methods and apparatuses for automatically canceling turn signals (e.g., blinkers, indicator lights, etc.) of vehicles, in particular, motorcycles.

2. Description of the Related Art

Conventionally, four-wheeled vehicles such as automobiles have functions for automatically canceling turn signals when drivers return steering wheels to normal positions after steered with relatively large steering angles, which are greater than prescribed steering values. In contrast, two-wheeled vehicles such as motorcycles normally do not have functions for canceling turn signals (or indicator lights for indicating directions to turn) once operated by drivers. In addition, substantially no effective proposals are made with respect to the aforementioned functions because motorcycles may not allow provision of additional structures for automatically canceling turn signals.

Therefore, conventional motorcycles are designed to require manual operation for canceling turn signals by hands once operated. This may cause unexpected problems due to failure or negligence of canceling turn signals, which drivers may easily forget to perform. In other words, when drivers operate turn signals, which should be canceled thereafter, drivers may have difficulties in sustaining concentration in driving motorcycles.

Japanese Unexamined Patent Publication No. Sho 57-155131 discloses an example of an automatic blinker canceller using a geomagnetic sensor for a motorcycle and the like. According to this automatic blinker canceller, blinkers are automatically canceled under prescribed conditions where a difference of bearing detected between the turning direction and traveling direction becomes greater than a prescribed angle, and the motorcycle is restored in a straight drive mode just after turnabout.

However, the aforementioned automatic blinker canceller requires complicated processing in detection as to restoration of a straight drive mode, and it is therefore expensive.

SUMMARY OF THE INVENTION

It is an object of the invention to provide a method and an apparatus for automatically canceling turn signals of motorcycles without causing operation error, which can be manufactured at low cost.

An automatic turn signal canceller of this invention is constituted using a geomagnetic sensor for detection of axial components of the geomagnetism (or magnetic field) and a conversion table storing relationships between bearings, inclinations, and outputs of the geomagnetic sensor, which are measured in advance.

For example, the operator (or rider) of a motorcycle operates turn signals to indicate leftward or rightward turning of the traveling direction; then, the operator turns the traveling direction while inclining the motorcycle; thereafter, the operator restores the motorcycle to the normal position substantially perpendicular to the horizontal plane. In this case, when the bearing of the motorcycle is varied by a prescribed angle (e.g., 20°) or more after the operator operates the turn signals, and then, the inclination of the motorcycle is restored to the normal position substantially perpendicular to the horizontal plane, the turn signals are automatically canceled.

Thus, it is possible to reliably avoid occurrence of operation error in canceling turn signals due to operator's failure or negligence. In addition, this invention can be easily realized at a relatively low cost because of the simple configuration thereof.

BRIEF DESCRIPTION OF THE DRAWINGS

These and other objects, aspects, and embodiments of the present invention will be described in more detail with reference to the following drawings, in which.

DESCRIPTION OF THE PREFERRED EMBODIMENT

This invention will be described in further detail by way of examples with reference to the accompanying drawings.

Figure 1:
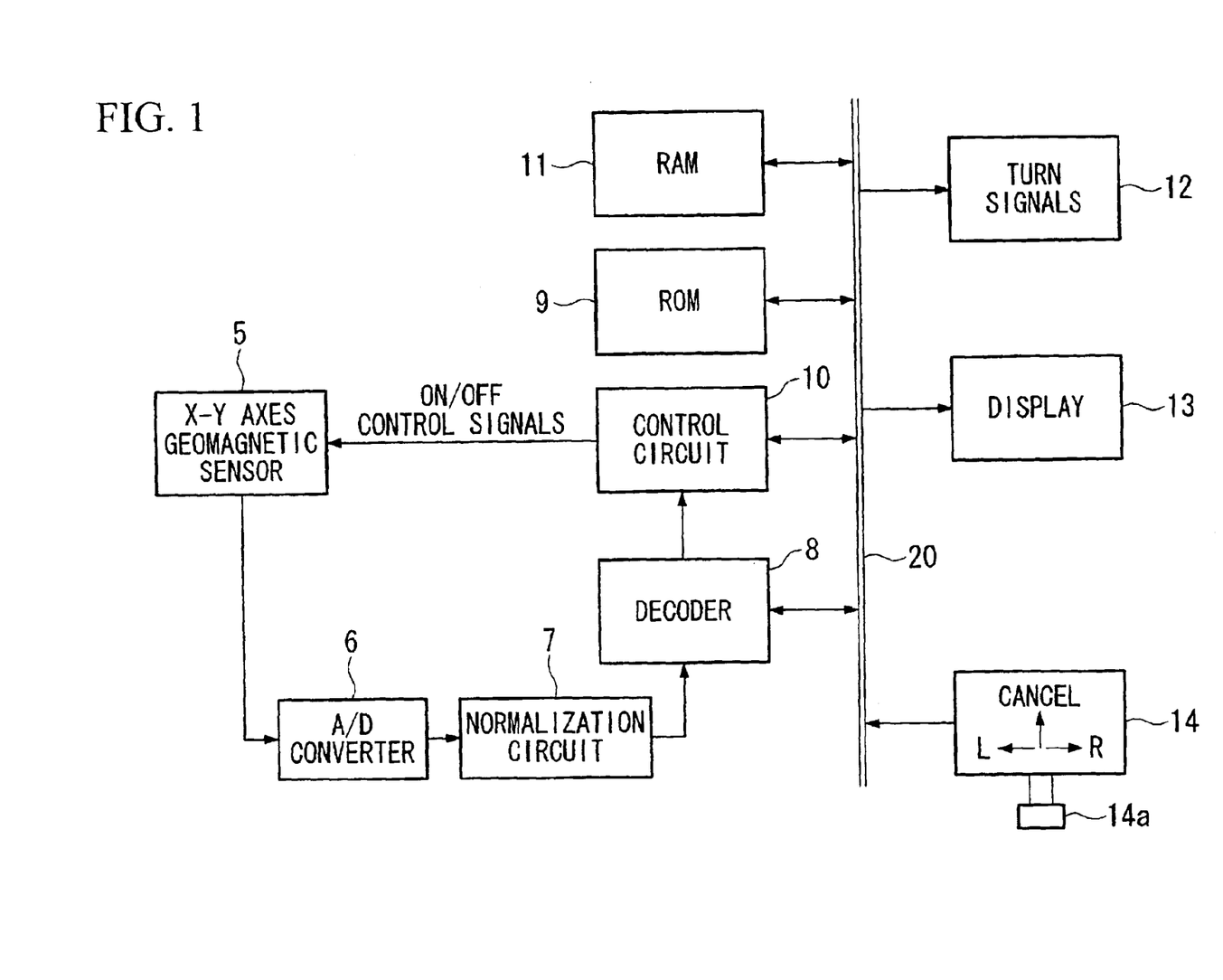
FIG. 1 is a block diagram showing the configuration of an automatic turn signal canceller for canceling turn signals of a motorcycle in accordance with one embodiment of the invention.

FIG. 1 shows the configuration of an automatic canceller for canceling turn signals of a vehicle such as a motorcycle in accordance with one embodiment of the invention. In summary, this automatic 'turn signal' canceller is designed to detect a direction and an inclination of the motorcycle based on the output of a geomagnetic sensor, which is installed in the motorcycle. Normally, after the driver operates turn signals of a motorcycle, the motorcycle is changed in traveling direction thereof while banking (or inclining the position or attitude thereof), and then, the motorcycle is restored to the upright position so that the inclination (or banking) thereof is cleared relative to the vertical axis thereof on the basis of the horizontal direction. In that situation, the automatic turn signal canceller is activated to automatically cancel turn signals of the motorcycle.

Specifically, an automatic turn signal canceller of the present embodiment installed in a motorcycle comprises an X-Y axes geomagnetic sensor 5 for detecting geomagnetism, an analog-to-digital (A/D) converter 6, a normalization circuit 7, a decoder 8, a read-only memory (ROM) 9, a control circuit 10, a random-access memory (RAM) 11, turn signals 12, a display 13, and a turn signal manipulator 14. Herein, two pairs of turns signals are arranged respectively at both the front and rear sides of the motorcycle, and the turn signal manipulator 14 is operated by an operator's hand when indicating a rightward or leftward direction to turn.

Figure 2:
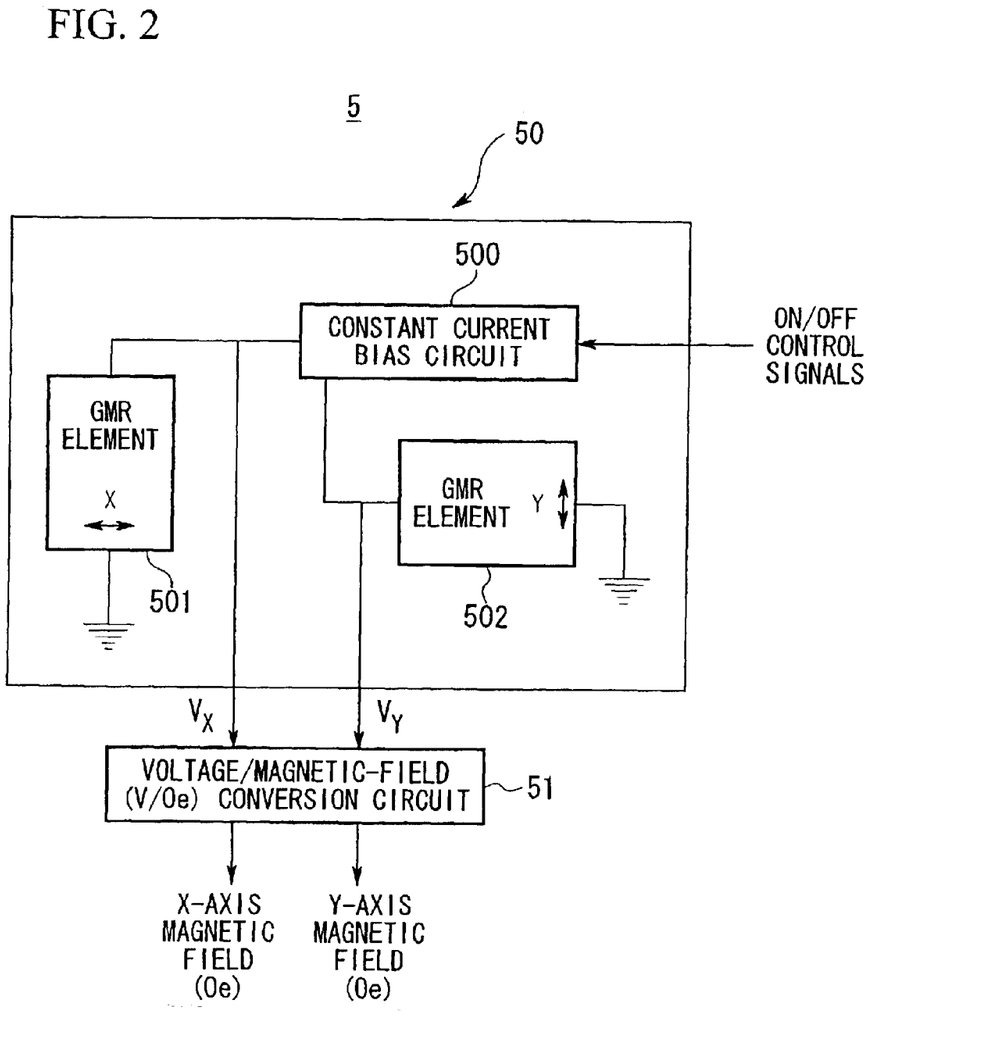
FIG. 2 is a block diagram showing the detailed configuration of an X-Y axes geomagnetic sensor shown in FIG. 1.

The X-Y axes geomagnetic sensor 5 is originally used to detect the bearing of the motorcycle, wherein it is also used for detection of the inclination of the motorcycle in the present embodiment. FIG. 2 shows the detailed configuration of the X-Y axes geomagnetic sensor 5, which is constituted by a giant magnetoresistive (GMR) circuit 50 and a voltage/magnetic-field (V/Oe) conversion circuit 51.

The GMR circuit 50 comprises a constant current bias circuit 500, an X-axis GMR element 501 for detecting an X-axis component of geomagnetism, and a Y-axis GMR element 502 for detecting a Y-axis component of geomagnetism.

Upon reception of an 'ON' control signal from the control circuit 10, the constant current bias circuit 500 supplies a constant current to both the X-axis GMR element 501 and the Y-axis GMR element 502. Each of the X-axis GMR element 501 and Y-axis GMR element 502 is varied in resistance in response to variations of a magnetic field (i.e., geomagnetism) applied thereto. Therefore, by supplying the constant current to them, it is possible to detect variations of the magnetic field, which are translated into variations of potentials. Specifically, when the GMR elements 501 and 502 of the X-Y axes geomagnetic sensor 5 rotate, X-axis and Y-axis components of the magnetic field applied thereto are varied and are detected as potential variations. Incidentally, when the motorcycle does not require the bearing and inclination thereof to be detected, the control circuit 10 outputs an 'OFF' control signal to the X-Y axes geomagnetic sensor 5 to inactivate its operation.

The voltage/magnetic-field conversion circuit 51 converts the output voltage of the GMR circuit 50 to a magnetic-field value, which is output therefrom.

The A/D converter 6 converts analog output signals of the X-Y axes geomagnetic sensor 5 to digital values, which are supplied to the normalization circuit 7. In the normalization circuit 7, digital values are each divided by the maximal value thereof.

The decoder 8 detects bearing (angle) α and inclination (angle)β based on the output of the X-Y axes geomagnetic sensor 5 with respect to the motorcycle equipped with the automatic turn signal canceller of the present embodiment.

The bearing a is defined in relation to the longitudinal axis of the body of the motorcycle as follows:

(a) When the longitudinal axis matches the north direction, the bearing a is set to 0 or 360 degrees (deg).
(b) When the longitudinal direction matches the east direction, the bearing a is set to 90 degrees (deg).
(c) When the longitudinal direction matches the south direction, the bearing a is set to 180 degrees (deg).
(d) When the longitudinal direction matches the west direction, the bearing a is set to 270 degrees (deg).

Next, a description will be given with respect to detection and calculation of the traveling direction of the body of the motorcycle, which can be defined by the bearing a and inclination β, on the basis of the output of the X-Y axes geomagnetic sensor 5.

Suppose that the motorcycle is placed in the upright or vertical position and is rotated in the horizontal plane, the output of the X-Y axes geomagnetic sensor 5 is varied in such a way that output Vx of the X-axis GMR element 501 is varied like a sine wave, while output Vy of the Y-axis GMR element 502 is varied like a sine wave but is shifted in phase by 90° in comparison with the output Vx. Therefore, coordinates of outputs Vx and Vy draw a prescribed locus, which may substantially correspond to a true circle (see "solid" circle shown in FIG. 3) about an origin 'O' in the orthogonal coordinate system in which the horizontal axis represents Vx, and the vertical axis represents Vy.

Figure 4:
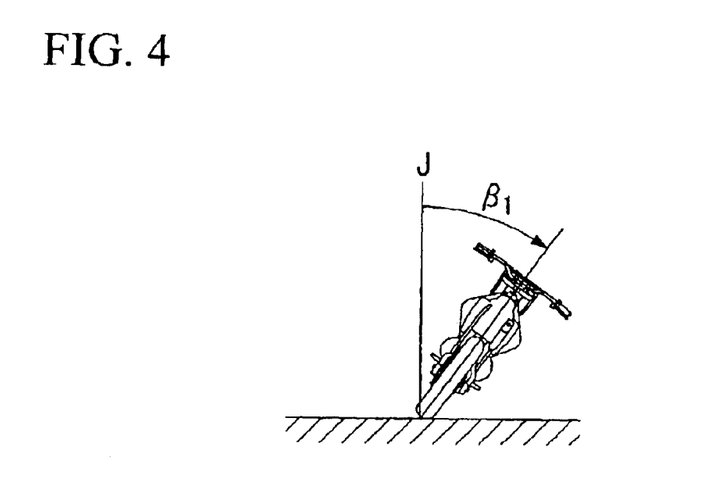
FIG. 4 is a rear view of a motorcycle that is inclined against a vertical axis on a horizontal plane.

The geomagnetism is not always distributed horizontally on the earth, but it may be inclined from the horizontal plane by certain angles in response to terrestrial locations. Therefore, when the body of the motorcycle is inclined by an angle β measured from the perpendicular axis, a variation is caused to occur with respect to an angle formed between the direction of geomagnetism and the orthogonal plane of the vertical direction of the body, which matches the horizontal plane when the motorcycle stands at the upright position. An influence due to the aforementioned variation of the angle may appear in the output Vy of the Y-axis GMR element 502. Incidentally, the X-Y axes geomagnetic sensor 5 is attached to a prescribed position of the body relative to a prescribed plane, which matches the horizontal plane when the motorcycle stands at the upright position.

When the motorcycle is forced to rotate about the vertical axis J while being inclined (or banked) by an angle β1, the locus corresponding to coordinates of outputs Vx and Vy is drawn as an elliptical circle (see "dotted" circle in FIG. 3) in the aforementioned orthogonal coordinate system, wherein the center of the dotted circle is moved upwardly in the positive direction of the vertical axis (Vy) in comparison with the center of the aforementioned solid circle.

When the motorcycle is forced to rotate about the vertical axis J while being inclined by an angle β2, which is greater than β1, the locus corresponding to coordinates of outputs Vx and Vy is drawn as an elliptical circle (see "dashed" circle in FIG. 3) in the aforementioned orthogonal coordinate system, wherein the minor diameter of the dashed circle is smaller than the minor diameter of the dotted circle, and wherein the center of the dashed circle is further moved upwardly in the positive direction of the vertical axis (Vy) in comparison with the center of the dotted circle.

Figure 3:
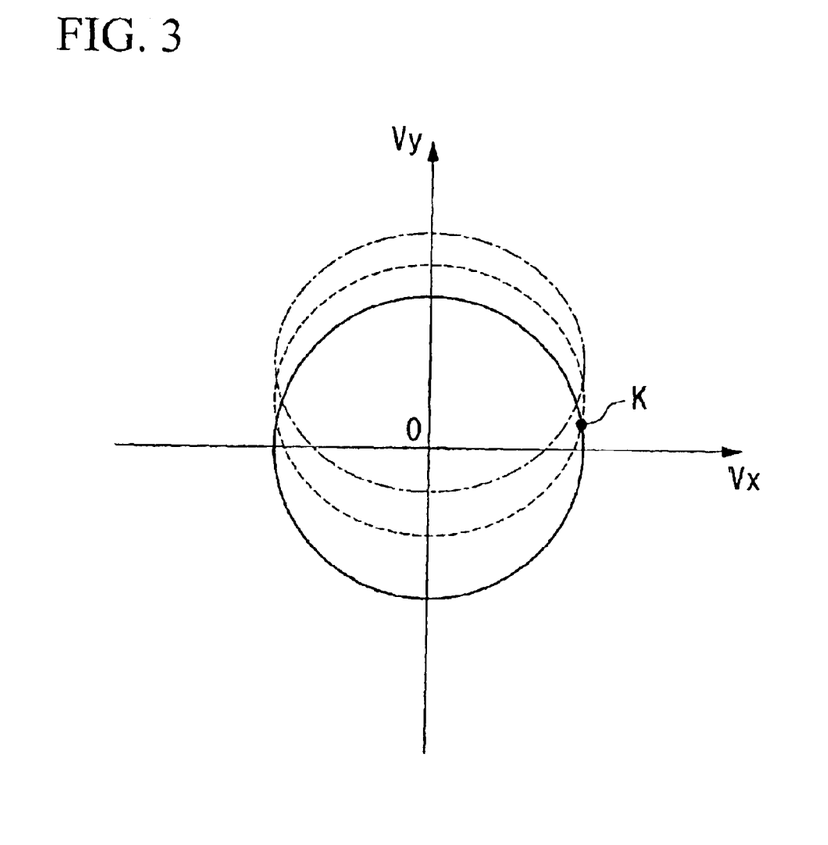
FIG. 3 is a graph showing examples of relationships between axial components of outputs of the X-Y axes geomagnetic sensor in an orthogonal coordinate system.

As long as an angle of geomagnetism against the horizontal plane (in other words, a terrestrial location (latitude and longitude) of the motorcycle is maintained, coordinates (Vx,Vy) consisting of the outputs Vx and Vy draw a certain locus, based on which the bearing α and inclination β of the motorcycle can be specified.

Therefore, the present embodiment is realized by preparing a conversion table storing relationships between bearings α, inclinations β, and coordinates (Vx,Vy), which are measured under an assumption that the motorcycle is located in areas where the inclination of the geomagnetism is substantially maintained constant. The aforementioned conversion table is stored in the ROM 9.

With reference to the conversion table stored in the ROM 9, it is possible to determine bearing α and inclination β of the motorcycle in relation to coordinates (Vx,Vy).

In the above, there is a possibility that two or more pairs of bearings and inclinations (α, β) could be measured with respect to the same coordinates (Vx,Vy), an example of which is shown by a point K in FIG. 3. In this case, plural pairs of bearings and inclinations (α, β) are measured in prescribed ranges of assumable (or possible) used states of the motorcycle, wherein average values thereof are used for the conversion table. Herein, prescribed ranges of assumable used states of the motorcycle can be set within a range of bearings α between 0 to 360 (deg) and a range of inclinations β between 0 to 45 (deg). An example of the content of the conversion table is shown in FIG. 5.

In FIG. 1, the ROM 9 stores various kinds of control programs and fixed data. The ROM 9 also stores the conversion table showing relationships between bearings (α) and inclinations (β) in relation to values Vx(Oe) and Vy(Oe), which are produced by normalizing outputs of the X-Y axes geomagnetic sensor 5 shown in FIG. 5.

The decoder 8 detects the traveling direction of the motorcycle (i.e., bearing α and inclination β) with reference to the aforementioned conversion table.

Figure 5:
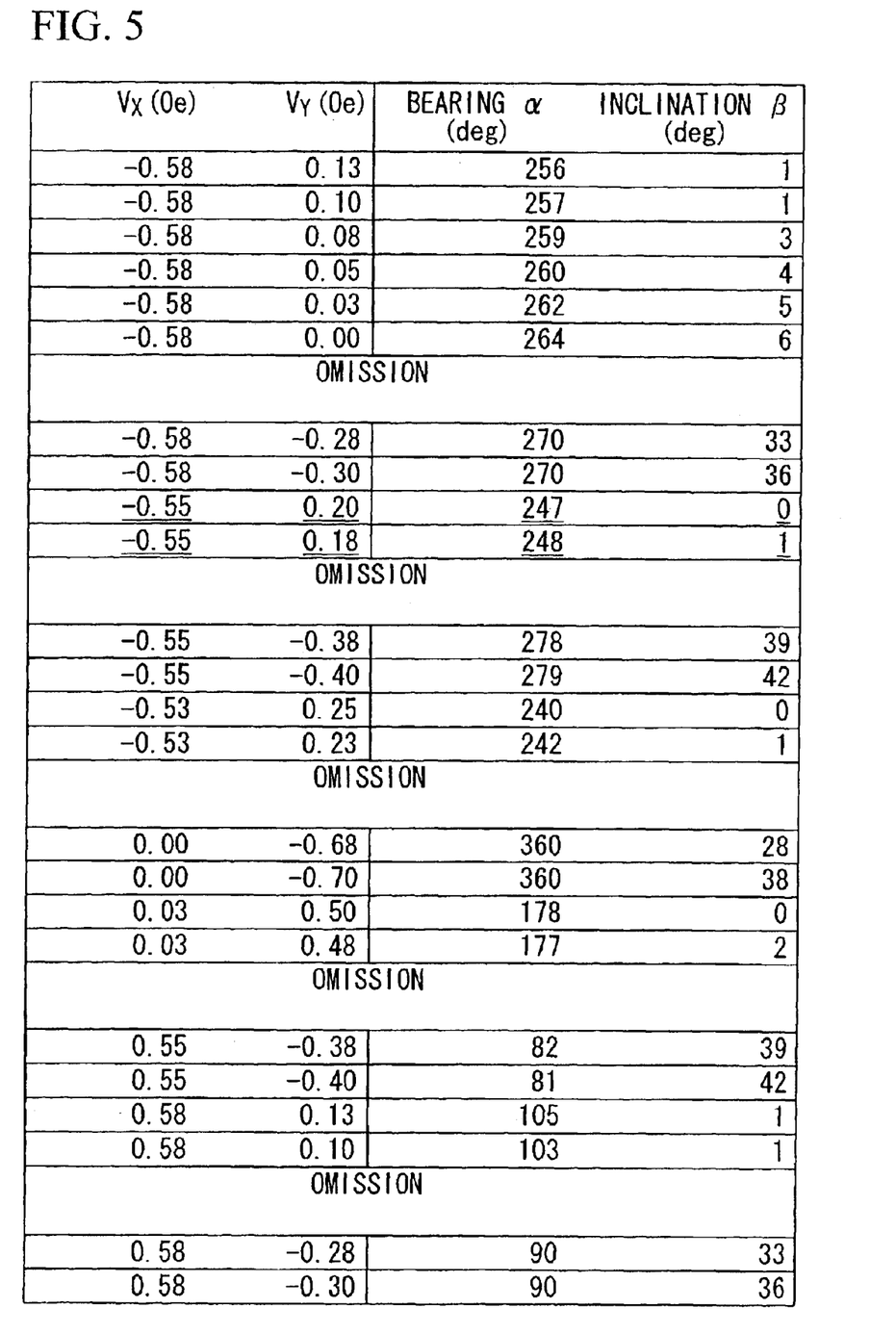
FIG. 5 is a table showing the content of a conversion table showing relationships between bearings, inclinations, and outputs of the X-Y axes geomagnetic sensor.

Using the conversion table of FIG. 5, it is possible to detect the bearing α and inclination β at a minimal resolution of one degree (see underlined numbers in FIG. 5). Therefore, the decoder 8 performs decoding to produce bearings and inclinations within prescribed ranges of values Vx and Vy shown in the conversion table.

The control circuit 10 executes control programs stored in the ROM 9, thus controlling various blocks of the automatic turn signal canceller of FIG. 1.

The display 13 is constituted by a liquid crystal display for displaying various data on the screen, for example, wherein it displays the detected bearing and inclination of the body of the motorcycle.

The turn signal manipulator 14 has a turn signal knob (or lever) 14a, which the driver can turn rightwards or leftwards to activate right turn signals or left turn signals (i.e., turn signals 12) to blink. In addition, the driver can push the turn signal knob 14a to turn off the turn signals 12. That is, the present embodiment allows the driver to cancel the turn signals 12.

Figure 6:
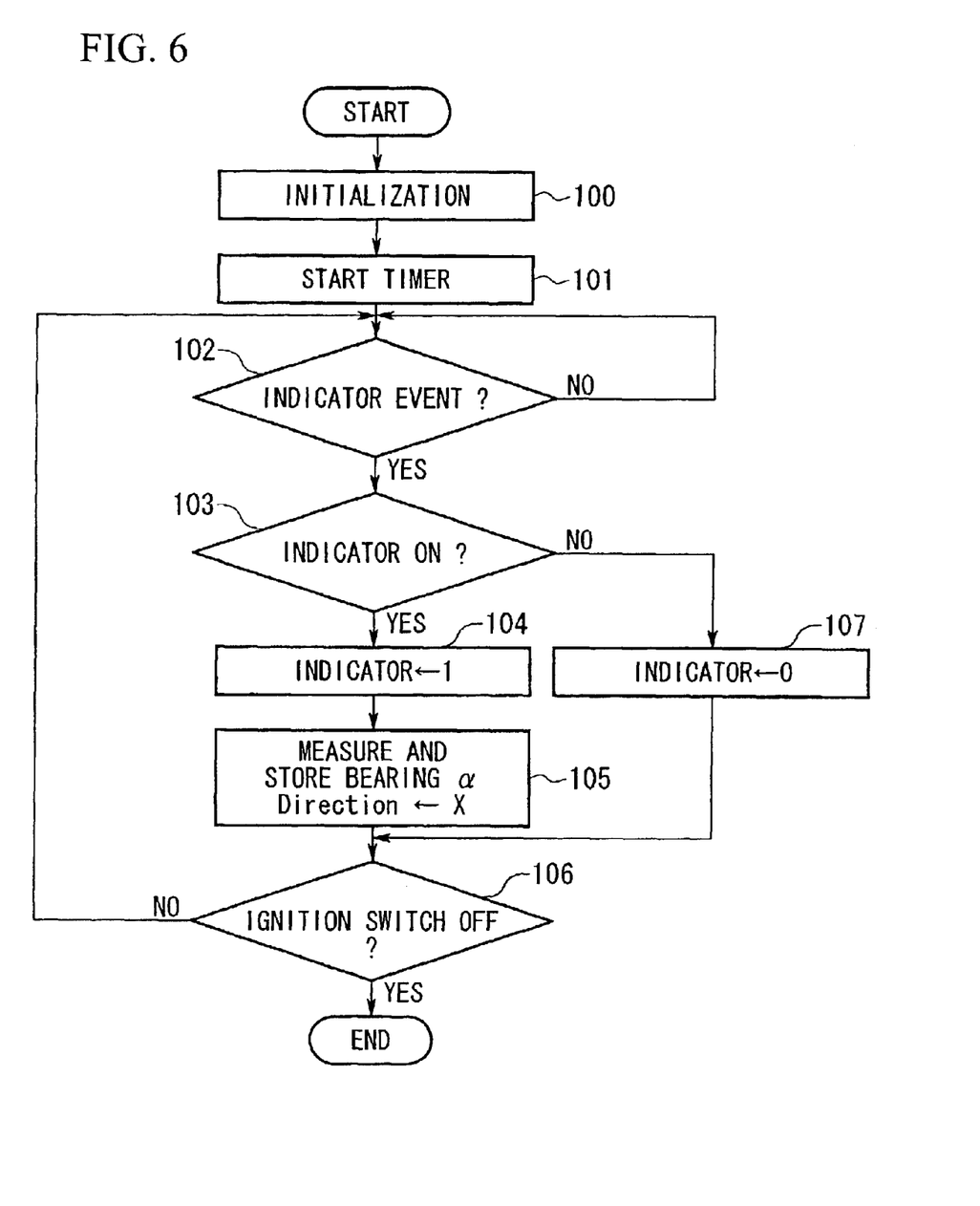
FIG. 6 is a flowchart showing a main routine of the automatic turn signal canceller.
Figure 7:
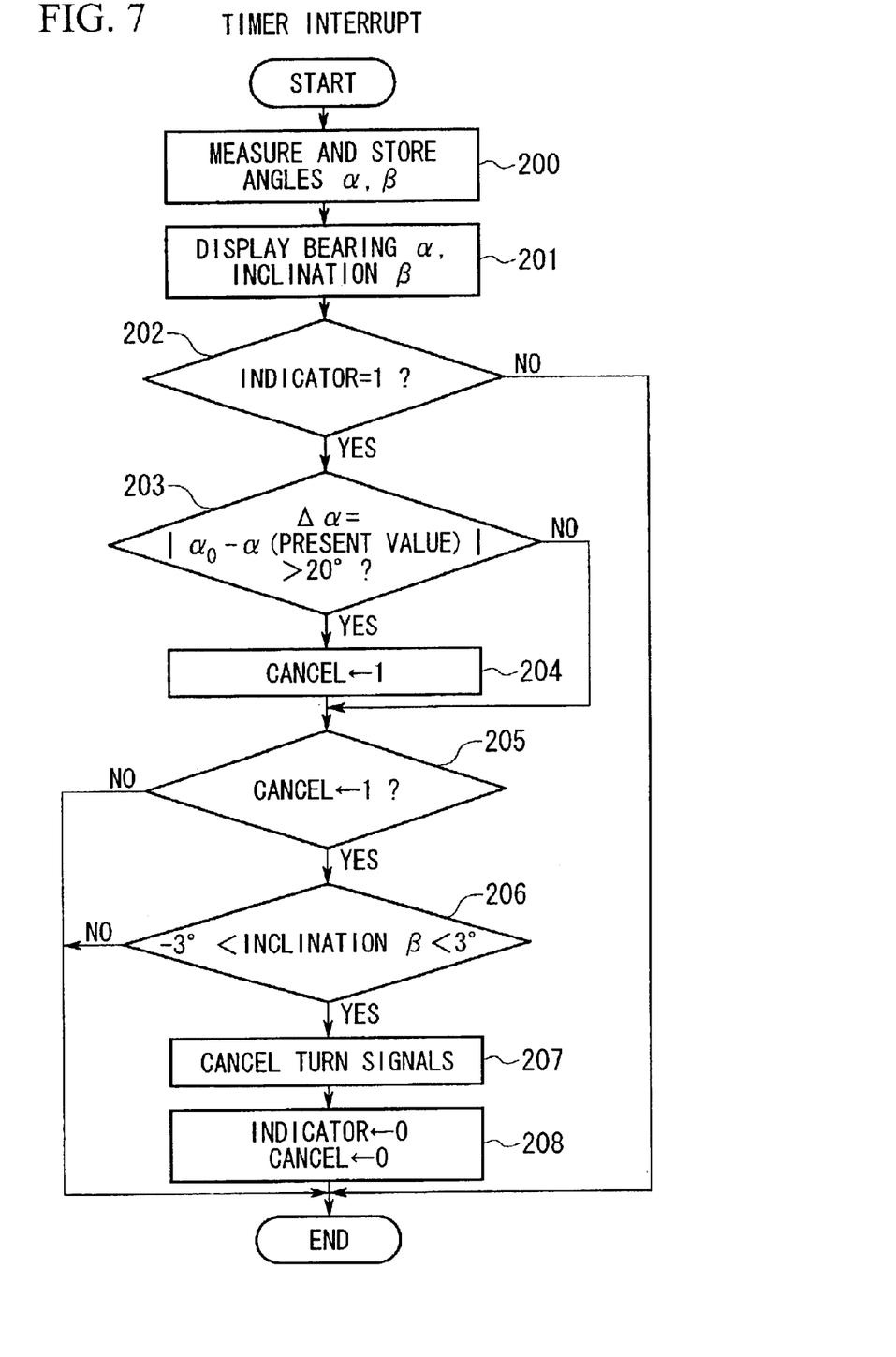
FIG. 7 is a flowchart showing a timer interrupt routine of the automatic turn signal canceller.

Next, the overall operation of the automatic turn signal canceller of the present embodiment will be described with reference to flowcharts shown in FIGS. 6 and 7. The flowchart of FIG. 6 shows a main routine that is executed when a power is turned on, and the flowchart of FIG. 7 shows a timer interrupt routine that is executed periodically in each prescribed period. When the driver enters a key into an ignition switch of the motorcycle to start an engine and to turn on power, the main routine of FIG. 6 is started so that in step 100, initialization (or initial setting) is automatically performed with regard to various factors and parameters. In step 101, a timer incorporated in the control circuit 10 is started, so that the timer interrupt routine of FIG. 7 is automatically started in each prescribed time measured by the timer.

In step 102, a decision is made as to whether or not an indicator event occurs, in other words, a decision is made as to whether or not the turn signal knob 14a of the turn signal manipulator 14 is operated by the driver. If 'NO' showing non-occurrence of an indicator event, the automatic turn signal canceller repeats the same decision of step 102. If 'YES' showing occurrence of an indicator event, the flow proceeds to step 103 in which a decision is made as to whether or not the driver turns on the turn signals 12, in other words, a decision is made as to whether or not the driver manipulates the turn signal knob 14a rightwards or leftwards.

If 'YES' in step 103, a flag 'Indicator' is set to '1' in step 104; then, the flow proceeds to step 105 in which in response to manipulation of the turn signal knob 14a that is turned rightwards or leftwards, a traveling direction of the motorcycle (i.e., bearing α relative to the vertical axis of the body of the motorcycle) is measured as a value α0, which is stored in a register 'Direction' in the RAM 11. Thereafter, the flow proceeds to step 106.

In the above, the flag Indicator is used to indicate whether or not the driver turns the turn signal knob 14a rightwards or leftwards.

If 'NO' in step 103, the flag Indicator is reset to '0' in step 107; then, the flow proceeds to step 106. In step 106, a decision is made as to whether or not an ignition switch is turned off. If 'NO', the flow returns to step 102. If 'YES', the automatic turn signal canceller ends the main routine.

Next, the timer interrupt routine will be described in detail with reference to FIG. 7. When the timer interrupt routine of FIG. 7 is started, the flow firstly proceeds to step 200 in which the decoder 8 detects bearing α and inclination β of the body of the motorcycle with reference to the conversion table stored in the ROM 9 on the basis of outputs Vx, Vy of the X-Y axes geomagnetic sensor 5, so that detected values are stored in the RAM 11.

In step 201, presently detected values of bearing α and inclination β are displayed on the screen of the display 13. In step 202, a decision is made as to whether or not the flag Indicator is set to '1'.

A bearing variation Δα(=|α0−α|) is detected between an initial bearing α0, which is detected at the time when the driver operates the turn signal knob 14a, and a present bearing α that is detected at the present time. In step 203, a decision is made as to whether or not the bearing variation Δα exceeds a prescribed angle of 20°. If 'YES', a flag 'Cancel' is set to '1' in step 204; then, the flow proceeds to step 205.

In the above, the flag Cancel is used to determine whether or not conditions required for cancellation of the turn signals 12 (i.e., conditions required for turning off the turn signals 12) are satisfied. If 'NO' in step 203, the flow proceeds to step 205.

In step 205, a decision is made as to whether or not the flag Cancel is set to '1'. If 'YES', the flow proceeds to step 206 in which a decision is made as to whether or not the inclination β of the body of the motorcycle, which is detected in step 200, belongs to a prescribed range of 3°<β<3°, in other words, a decision is made as to whether or not the motorcycle completely finishes turning the traveling direction thereof and is restored to the normal position perpendicular to the horizontal plane so that the inclination β thereof once increased is restored. If 'YES' in step 206, the automatic turn signal canceller automatically cancels the turn signals 12 in step 207. In step 208, both the flag Indicator and the flag Cancel are reset to zero; thereafter, the timer interrupt routine of FIG. 7 is ended.

Incidentally, when either the decision of step 205 or the decision of step 206 results in 'NO', the timer interrupt routine is ended. Therefore, the timer interrupt routine consisting of steps 200 to 208 is periodically executed in each prescribed period.

The aforementioned values of 20°, −3°, and 3°, which are used in the decision of step 205 regarding Δα and the decision of step 206 regarding β, are merely examples and are not restrictive; hence, it is possible to use optimal values that could be determined through experiments, for example.

The automatic turn signal canceller of the present embodiment for use in the motorcycle is designed in such a way that the bearing and inclination of the body of the motorcycle are detected based on outputs of the X-Y axes geomagnetic sensor installed in the body of the motorcycle, wherein when the traveling direction of the motorcycle is changed upon manipulation of the turn signals, and then, the inclination of the body of the motorcycle is restored to the normal position perpendicular to the horizontal plane, the turn signals are automatically canceled. Therefore, it is possible to avoid occurrence of operator errors in canceling the turn signals, and the automatic turn signal canceller can be manufactured with a relatively low cost because of the simple configuration thereof.

Specifically, the automatic turn signal canceller requires a single geomagnetic sensor for use in detection of bearing and inclination of the motorcycle with regard to the traveling direction. Herein, the automatic turn signal canceller can perform determination as to the restoration to the normal position being established after the motorcycle completely finishes turning the traveling direction thereof on the basis of variations of the bearing and inclination of the motorcycle, so that the turn signals can be reliably canceled upon the aforementioned determination.

As described heretofore, this invention has a variety of technical features and effects, which will be described below.

(1) An automatic turn signal canceller of this invention is constituted using a single geomagnetic sensor for use in detection of bearing and inclination of a motorcycle, wherein turn signals are automatically canceled under prescribed conditions regarding variations of bearing and inclination of the motorcycle. Specifically, a conversion table showing relationships between bearings, inclinations, and outputs of the geomagnetic sensor, which are measured in advance, is used to detect bearing and inclination of the motorcycle at any terrestrial location.

(2) In the above, the bearing and inclination of a motorcycle are detected in response to outputs of the geomagnetic sensor installed in the body of the motorcycle, wherein when the motorcycle is changed in the traveling direction thereof upon operation of turn signals, and then, the motorcycle is restored to the normal position substantially perpendicular to the horizontal plane, the turn signals are automatically canceled.

(3) More specifically, the bearing and inclination of the motorcycle are detected with reference to the conversion table, wherein when the bearing of the motorcycle is varied by a prescribed angle or more after the driver operates the turn signals, and then, the motorcycle is restored to the normal position substantially perpendicular to the horizontal plane, the turn signals are automatically canceled.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within metes and bounds of the claims, or equivalents of such metes and bounds are therefore intended to be embraced by the claims.

What is claimed is:

1. A method for automatically canceling turn signals of a vehicle, comprising the steps of:

deciding whether bearing and inclination of the vehicle satisfy prescribed conditions after the turn signals are operated; and automatically canceling the turn signals when the bearing and inclination of the vehicle satisfy the prescribed conditions.

2. A method for automatically canceling turn signals of a vehicle according to claim 1, wherein the prescribed conditions are described in such a way that upon operation of the turn signals, the vehicle is changed in a traveling direction thereof so that the bearing thereof is correspondingly changed by a prescribed angle or more, and then, the inclination of the vehicle is restored to a normal position perpendicular to a horizontal plane.

3. A method for automatically canceling turn signals of a vehicle according to claim 1, wherein the vehicle is a motorcycle whose inclination is changed when turning the traveling direction thereof.

4. A method for automatically canceling turn signals of a vehicle according to claim 1, wherein both the bearing and inclination of the vehicle are detected using a single geomagnetic sensor.

5. A method for automatically canceling turn signals of a vehicle according to claim 1, wherein both the bearing and inclination of the vehicle are detected using a conversion table whose content is prepared in advance on the basis of axial outputs of a geomagnetic sensor.

6. A method for automatically canceling turn signals of a vehicle according to claim 1, wherein the prescribed conditions are described in such a way that a variation of the bearing of the vehicle exceeds a prescribed angle when the vehicle is changed in a traveling direction thereof after the turn signals are operated, and then, the inclination of the vehicle is restored within a prescribed range of angles.

7. An automatic turn signal canceller for a vehicle, comprising:

a geomagnetic sensor for detecting geomagnetism in terms of an orthogonal coordinate system constructed by different axes;

a storage for storing a conversion table whose content represents relationships between bearings, inclinations, and axial outputs of the geomagnetic sensor, which are measured in advance at prescribed terrestrial locations; and a controller for controlling turn signals of the vehicle to be automatically cancelled when the bearing and inclination of the vehicle satisfy prescribed conditions after the turn signals are operated.

8. The automatic turn signal canceller for a vehicle according to claim 7, wherein the prescribed conditions are described in such a way that upon operation of the turn signals, the vehicle is changed in a traveling direction thereof so that the bearing thereof is correspondingly changed by a prescribed angle or more, and then, the inclination of the vehicle is restored to a normal position perpendicular to a horizontal plane.

9. The automatic turn signal canceller for a vehicle according to claim 7, wherein the vehicle is a motorcycle whose inclination is changed when turning a traveling direction thereof.

10. The automatic turn signal canceller for a vehicle according to claim 7, wherein the prescribed conditions are described in such a way that a variation of the bearing of the vehicle exceeds a prescribed angle when the vehicle is changed in a traveling direction thereof after the turn signals are operated, and then, the inclination of the vehicle is restored within a prescribed range of angles.

* * * * *